April 7, 1953     O. W. DOMRIES     2,633,686
DISK HARROW
Filed Oct. 11, 1948     2 SHEETS—SHEET 1
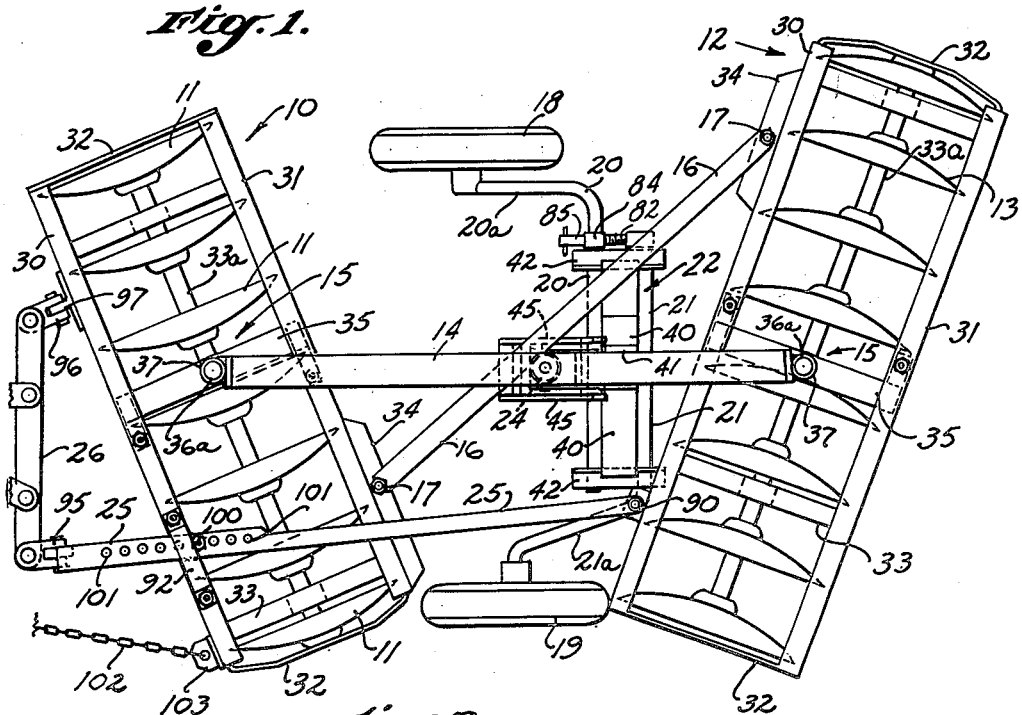
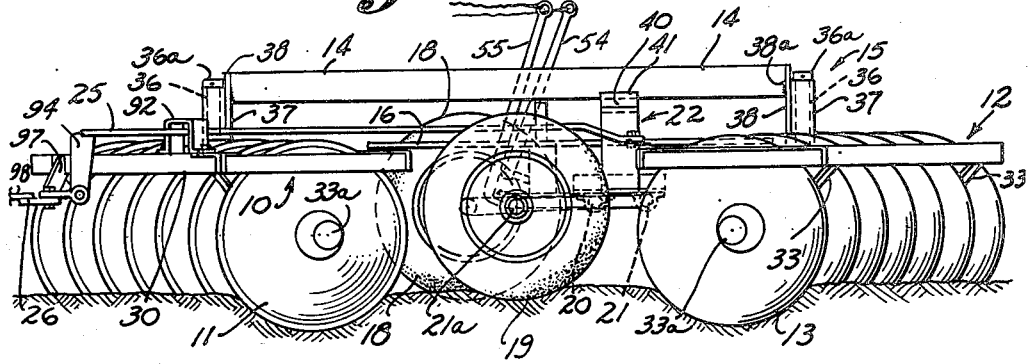
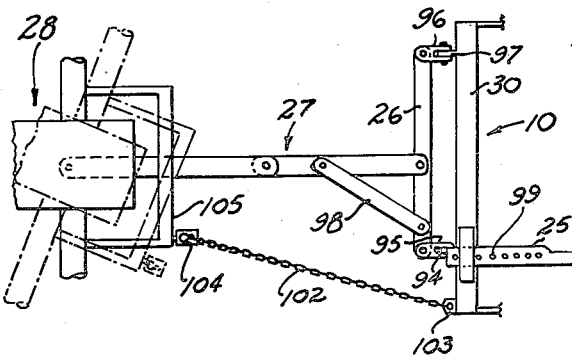
INVENTOR:
OTTO W. DOMRIES
BY HIS ATTORNEYS
HARRIS, KIECH, FOSTER & HARRIS April 7, 1953     O. W. DOMRIES     2,633,686
DISK HARROW
Filed Oct. 11, 1948     2 SHEETS—SHEET 2
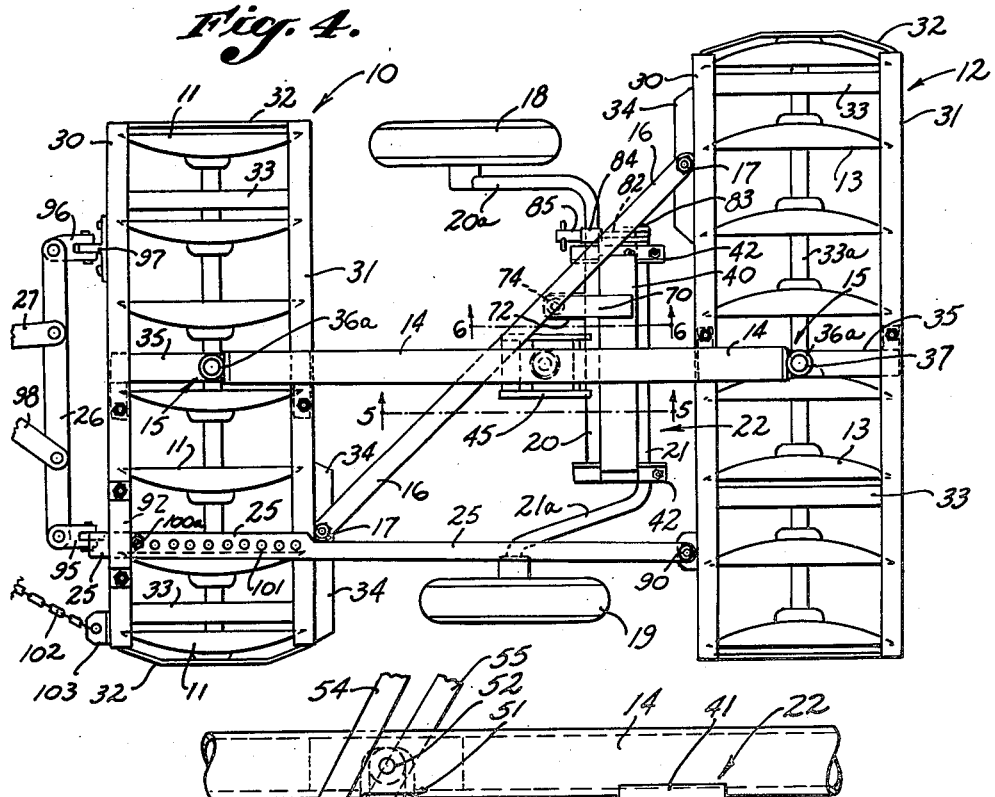
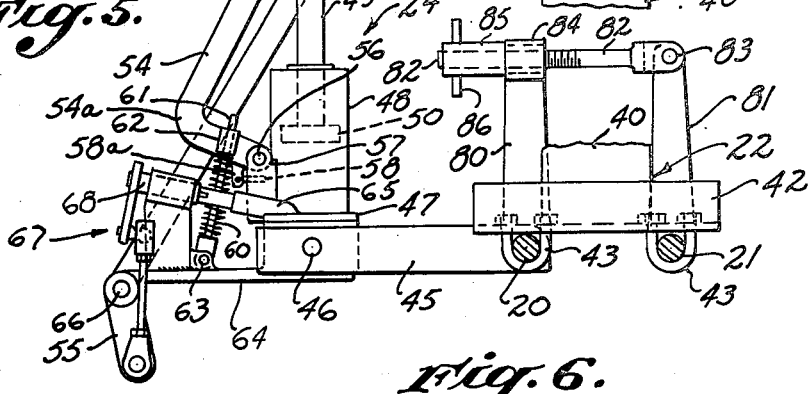
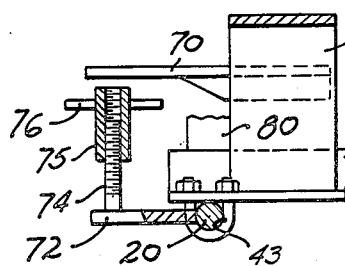
INVENTOR:
OTTO W. DOMRIES
BY HIS ATTORNEYS
HARRIS, KIECH, FOSTER & HARRIS Patented Apr. 7, 1953

2,633,686

UNITED STATES PATENT OFFICE 2,633,686

DISK HARROW

Otto W. Domries, Anaheim, Calif.

Application October 11, 1948, Serial No. 53,854

10 Claims. (Cl. 55—73)

1

This invention relates to earth cultivating apparatus of the type commonly referred to as disc harrows or disc plows, and has to do more particularly with discing apparatus employed in conjunction with ground wheels upon which the discing apparatus may be carried for the purpose of transport or when making turns in the field.

Heretofore, when using most types of disc harrows or disc plows, there has been difficulty in transporting the same and in making turns in the field because of the fact there has been no means for lifting the discs from the earth being cultivated, and in connection with other forms means for supporting the discs in elevated position above the earth have not been entirely satisfactory.

It is, therefore, an object of this invention to provide a structure for disc plows, or disc harrows as the term will be used hereinafter, which will be thoroughly satisfactory for elevating the discs from the soil for the purpose of transport from place to place or for any other purpose including the making of turns.

Another object of the invention is to provide a wheeled carriage of novel construction upon which all or a portion of the weight of the discs and their supporting frames may be easily disposed as desired, and penetration of the discs into the soil regulated as required.

A still further object is to provide in a disc harrow having ground wheels a structure by means of which the discs may be automatically drawn into the conventional diverging arrangement when they are lowered into operative position on the soil and forward movement of the tractive vehicle pulling the same is commenced.

It is also an object of the invention to provide means which may be easily operated by the tractor driver for the purpose of raising and lowering the discs at will.

An additional object of the invention is to provide positioning means interconnecting the frames which carry the disc so that the relative positions of the frames and their discs may be automatically established at the will of the tractor driver.

Still another object of the invention is to provide in a disc harrow an overhead supporting means for the discs and their frames which may be raised and lowered for the purpose of raising the discs and their frames as desired and which will at the same time hold such frames and discs appropriately balanced in a substantially horizontal relationship.

A particular object of the invention is to provide a disc harrow having ground wheels for the purpose of supporting the same in elevated position by means of which forward and rearward gangs of discs carried upon forward and rearward frames may be automatically shifted into operative position or into transport position by the simple expedient of moving a tractive vehicle slightly forward or slightly rearward to effect the respective adjustment.

Additional objects are to provide novel means for limiting soil penetration and for varying the relative operating elevations of ground wheels with respect to the discs when one wheel works in a furrow.

Other objects, and the various features of construction of the invention, will become apparent to those skilled in the art upon reference to the following specification and the accompanying drawings wherein one preferred embodiment of the invention is disclosed by way of illustration.

In the drawings:

Fig. 1 is a plan view illustrating the various parts of the apparatus in discing position;

Fig. 2 is a side elevation illustrating the parts in the relationship shown in Fig. 1 as viewed from the left side of the apparatus as it proceeds forward, such forward direction being toward the left side of the sheet;

Fig. 3 is a diagrammatic plan view illustrating the draft connection between the harrow of Fig. 1 and a conventional tractor;

Fig. 4 is a plan view similar to that of Fig. 1 but showing the parts in transport position, the frames carrying the discs being drawn into parallel relationship from the diverging, discing position of Fig. 1;

Fig. 5 is a fragmentary elevation on an enlarged scale, the view being taken approximately from the line 5—5 of Fig. 4 from which two operating levers and associated linkages have been omitted to facilitate the showing of the other mechanism of Fig. 4; and Fig. 6 is an enlarged detail in elevation substantially as indicated by the line 6—6 of Fig. 4.

As seen in Figs. 1 and 4, the major parts of the apparatus illustrated are a forward disc frame 10 having conventional discs 11, a rearward disc frame 12 having conventional discs 13, an overhead lifting and spacing beam 14 whose ends are pivotally attached to the central portion of the disc frames 10 and 12 by means of vertically disposed pivotal mounts 15, a diagonally disposed connecting and positioning bar 16 whose ends are pivotally attached at 17 to the respective frames 10 and 12, a right ground wheel 18 and a left ground wheel 19 which are respectively mounted upon bent axles 20 and 21, a transverse carriage 22 supported on the axles 20 and 21 and in turn supporting at its middle the overhead lifting beam 14, a hydraulic elevator 24 best illustrated in Fig. 5, and a pull link 25 whose rearward end is attached to the rearward disc frame 12 and whose forward end is attached to a swingable draw bar 26 provided with a conventional tongue 27 attached at its forward end to a conventional tractor 28 by means of a conventional pivotal mounting 29 as seen in Fig. 3.

Each of the forward and rearward disc frames 10 and 12 is conventionally constructed with a front rail 30 and a rear rail 31, the respective front and rear rails 30 and 31 being connected by end bars 32 and by brackets 33 which serve both to rigidify the frame and to provide mountings on dependent portions thereof for shafts 33a which carry the discs 11 and 13 in a conventional manner. In addition, the rear rail 31 of the forward disc frame 10 and the forward rail 30 of the rearward disc frame 12 are respectively provided near one end with laterally projecting anchor strips 34 which may be in the form of short angle irons welded to the respective rails and carry the pivots 17 for the connecting and positioning bar 16 which extends diagonally across the structure, as will be seen in both Figs. 1 and 4, so that pivotal movement of the disc frames 10 and 12 on the pivotal mounts 15 will be synchronous and so that pivotal movement of one frame in one direction will be imparted to the other frame in the opposite direction. This of course is due to the crossing of the spacing beam 14 and the positioning bar 16 and the crossing of the respective lines of pull.

In addition, each of the disc frames 10 and 12 is provided adjacent its middle with a rigid transverse carrier plate 35 which in practice is a channel bar having its ends welded to the respective rails 30 and 31, the middle portion of each carrier plate providing anchorage for the respective pivotal mount 15 at the respective end of the overhead lifting beam 14. Each pivotal mount 15 is in the form of a heavy upstanding stud 36 whose lower end is rigidly secured to the respective carrier plate 35 and whose body portion is received in a heavy sleeve 37 and held in operative position by an appropriate head 36a on the top of the stud. Each sleeve 37 in the form shown is rigidly attached to the respective end of the overhead lifting beam 14 by being welded to an upstanding plate 38 whose upper portion is in turn welded to the end of the beam 14 as indicated at 38a in Fig. 2. As indicated in Fig. 5, the beam 14 may be of heavy tubular construction and the attaching plates 38 are intended to close the open ends of the tube. By the means illustrated in Fig. 2, the disc frames 10 and 12 swing upon the pivotal mounts 15 as centers by reason of the rotation of the studs 36 in the sleeves 37, and when the lifting beam 14 is raised by the hydraulic elevator 24 the disc frames 10 and 12 are lifted through the medium of the heads 36a on the studs 36 by reason of the fact that the head 36a overhangs the sleeve 37 in each instance and thereby serves as a lifting agency.

The carriage means 22, which supports the lifting beam 14 upon the axles 20 and 21 through the medium of which the weight of the lifting beam 14 and the disc frames 10 and 12 is transferred to the ground wheels 18 and 19, comprises, in the form shown, a rigid yoke 40 which extends transversely of the lifting beam 14 and of the harrow structure and has its middle portion welded, as indicated at 41, to the underside of the lifting beam 14. This yoke 40 is of comparatively wide strap material of somewhat arcuate formation, and its ends are directed downward to a position adjacent the axles 20 and 21. Each end of the yoke 40 has secured thereto an angular attachment bracket 42 of conventional angle material whose upstanding web is welded to the adjacent yoke and whose horizontal web rests upon the transverse body portions of both the axles 20 and 21. The angular attachment brackets 42 are secured to the axles 20 and 21 as by means of U-bolts 43 as best illustrated in Fig. 5, these bolts serving as bearings for the axles.

In order to mount the hydraulic elevator 24 in proper position between the lifting beam 14 and the ground wheels 18 and 19, mounting arms 45 which act as lever arms are welded to the body portion of the forward axle 20 in position to extend approximately horizontally forward when the parts are in an intermediate relationship such as that illustrated in Fig. 5. The forward ends of the mounting arms 45 are apertured to receive trunnions 46 which project laterally from the sides of a base 47 provided on the lower end of a hydraulic cylinder 48 which is mounted in an upright position as seen in Fig. 5 and has projecting upwardly therefrom a piston rod 49 whose lower end is operatively disposed within the cylinder 48 for the purpose of carrying a piston 50 or the like. The upper end of the piston rod 49 projects through an opening 51 in the underside of the tubular lifting beam 14 so as to receive a transverse pivot bolt 52 or the like which extends through the sides of the lifting beam 14 and acts to provide a pivotal mounting for the upper end of the piston rod 49.

The piston rod 49 and its piston 50 in the cylinder 48 of the hydraulic elevator 24 are controlled through the medium of a pump lever 54 and a bleeder valve handle 55 positioned approximately as seen in Fig. 5. The lower end of the pump lever 54, which is in the form of a bent lever, is fulcrumed at 56 on the upper end of a bracket 57 secured to the hydraulic cylinder 48, the lever 54 actuating any appropriate pump means, such as a plunger 58, through the medium of any bearing member such as the depending boss 58a illustrated. The pump lever 54 is adapted to be actuated through the medium of a cable attached to the upper end thereof and extending forward to the driver's seat, approximately as indicated in Fig. 2, whereby to operate the plunger 58, the lever 54 being automatically returned to its initial position as by means of a spring 60 (Fig. 5) disposed about a guide stem 61 whose upper end passes loosely through any appropriate guide 62 on the lower end of the lever 54 and whose lower end is mounted upon a pivot 63 carried on a bracket 64 extending forward from the lower portion of the base 47 of the hydraulic cylinder 48.

The handle 55, which is provided for the purpose of actuating a bleeder 65 at the base of the hydraulic cylinder 48, is in the nature of a lever fulcrumed at 66 on the forward end of the bracket 64. The lower end of the handle 55 is connected to and actuates any appropriate linkage generally indicated at 67 which is fixed to the outer end of a rotary valve stem 68 leading to the bleeder valve 65. The handle 55 also is operated by the tractor driver by means of a cable or the like, as indicated in Fig. 2, and it is adapted to be returned to its initial position of Fig. 5 either by gravity or by means of any appropriate spring device, not shown.

From the foregoing it will be apparent that by drawing forward the upper end of the pump lever 54 the plunger 58, or similar pumping means, will be actuated to introduce hydraulic fluid under the piston 50 for the purpose of elevating the piston rod 49, the lever 54 being returned automatically by the spring 60. Such operation of the lever 54 repeatedly serves to expel the piston rod 49 to whatever extent required, whereby to separate the lifting beam 14 and the outer ends of the lever-like mounting arms 45, thereby pushing the lifting beam 14 upward with respect to the ground wheels 18 and 19. The lifting of the beam 14 in turn lifts the disc frames 10 and 12 through the medium of the heads 36a on the studs 36 (Fig. 2) of the pivotal mounts 15. By slight actuation of the valve handle 55 toward a position such as illustrated in Fig. 2, hydraulic fluid under the piston 50 may be relieved to any extent desired, thereby lowering the lifting beam 14 and the disc frames 10 and 12 as required and to regulate the penetration of the discs 11 and 13 into the soil (see Fig. 2) as deemed best.

For the purpose of positively limiting the descent of the lifting beam 14 and the disc frames 10 and 12, an adjustable stop device is employed which is illustrated in Fig. 6, such stop device includes a heavy stop arm 70 which is horizontally disposed with its forward portion projecting forward from the rigid transverse yoke 40, its rearward portion being welded to the yoke 40 at a position somewhat laterally disposed from the lifting arm 14 as seen near the center of Fig. 4. This arm 70 and associated parts are omitted from the other figures to avoid confusion. The arm 70 is disposed immediately above a short lever arm 72 welded to the forward side of the adjacent axle 20. The lever arm 72 has rigidly mounted on its upper face at its forward end a screw 74 upon whose upper end there is rotatably mounted an internally threaded sleeve 75 having handle means 76 whereby the sleeve 75 may be vertically adjusted on the screw 74 as desired. With this stop device, the spacing between the upper end of the sleeve 75 and the underside of the adjacent portion of the horizontal stop arm 70 may be predetermined for correspondingly limiting the descent of the discs 11 and 13 into the soil in accordance with the nature of the soil or the character of the cultivation to be given to it.

Means is also provided for varying the elevation of one of the ground wheels with respect to the other, as when it is desired to maintain the disc frames 10 and 12 and their discs 11 and 13 in a comparatively horizontal working position while the left ground wheel 19, for example, travels in a furrow produced by the disc 11 immediately in front of it and while the right ground wheel 18 travels upon the loose earth that has been filled into a corresponding furrow formed by the immediately preceding right disc 11 through the earth shifting action of the nearest disc 11 when the harrow parts are in the operative relationship seen in Fig. 1. Such means for varying the relative elevation of the ground wheels 18 and 19 is best seen in Fig. 5. It comprises an upstanding arm 80 rigidly attached to the transverse body portion of the axle 20 and a cooperating upstanding arm 81 rigidly attached to the body portion of the axle 21 of the left ground wheel 19. A position regulating link 82 connects the upper ends of the upstanding arms 80 and 81, and in the form shown, the rear end of the link 82 is pivoted at 83 to the upper end of the arm 81, the forward end of the link 82 loosely projecting through an eye 84 on the upper end of the arm 80 and threadedly receiving on its outer end an internally threaded sleeve 85 having handle means 86 or the like for rotatably adjusting such threaded sleeve 85. It will be apparent that, as the sleeve 85 is threaded along the link 82 to shorten the effective length of the link 82, the upper ends of the upstanding arms 80 and 81 will be drawn together and the laterally disposed arm 21a of the axle 21 will be depressed with respect to the laterally disposed arm 20a of the axle 20, so that the left ground wheel 19 may assume a lower position with respect to the horizontal plane of the axles 20 and 21 and the right ground wheel 18. Since the position of the laterally disposed arm 20a of the axle 20 is fixed by the hydraulic elevator 24 through the medium of the mounting arms 45 rigidly attached to the axle 20, the position of the upstanding arm 80 on the axle 20 likewise is fixed. Therefore, the adjustment of the length of the link 82 is, in effect, imparted through the upstanding arm 81 to the lateral axle arm 21a and the left ground wheel 19. By such means the transverse body portions of the axles 20 and 21 and the disc frames 10 and 12 are maintained in a level or horizontal position when the left ground wheel 19 travels in a furrow. In order to insure maintenance of the frames 10 and 12 in such horizontal position, it is preferable that their weights on opposite sides of the pivotal mounts 15 be balanced as well as possible.

In order that the disc frames 10 and 12 and their discs 11 and 13 may be easily drawn from the inoperative or transport position of Fig. 4 into the operative discing position of Fig. 1 merely by draft from the tractor 28 or other tractive vehicle, the previously described pull link 25 has its rearward end attached by a vertical pivot bolt 90 or the like to a forwardly extending ear 91 on the forward side of the front rail 30 of the rearward disc frame 12. The forward end of the pull link 25 is passed loosely through an elongated guide loop 92 on the front rail of the forward frame 10, so that such forward end of the pull link 25 may slide freely through the guide loop 92 between the position of Figs. 1 and 2 and the position of Fig. 4. The forward extremity of the pull link 25 rigidly carries a depending arm 94 (Fig. 2) whose lower end is attached by a clevis 95 to the left end of the draw bar 26, the opposite end of the draw bar 26 being connected by a clevis 96 to a depending bracket arm 97 rigidly secured to the forward face of the front rail 30 of the forward disc frame 10. Thus, when draft by the tractor 28 is transmitted to the draw bar 26 by the tongue 27 and a brace 98 (Fig. 3), the pull link 25 operates upon the left end of the rearward disc frame 12 to draw it forward from its position of Fig. 4 to its position of Fig. 1 until checked by some means such as a vertically disposed stop bolt or pin 100 (Fig. 1) selectively disposed in any one of a plurality of holes 101 in the pull link 25, such pin 100 being adapted to strike the rear edge of the guide loop 92 and preferably the rear edge of the adjacent front rail 30.

As a consequence of the forward movement of the left end of the rearward disc frame 12, a corresponding rearward movement of the left end of the forward disc frame 10 takes place by reason of the pull imparted by the diagonally disposed connecting and positioning arm 16. By arranging the parts substantially as illustrated, the forward movement of the clevis 95 is substantially equal to the forward movement of the clevis 96 as the frame 10 swings about its pivotal mount 15. Thus, the draw bar 26 is always substantially parallel to the body portions of the axles 20 and 21, and as a consequence the braced tongue 27 extends forward in a position substantially parallel to the line of travel.

When the harrow parts are in the usual discing position somewhat as shown in Fig. 1 they are also in an appropriate position for making a left turn. However, the forward discs 11 are not in good position for making a right turn, inasmuch as they would then bend to gouge flatwise into the earth. To overcome this difficulty, a drag chain 102 or the like, has its rearward end attached to a lug 103 on the left end of the forward side of the front rail of the front disc frame 10, the forward end of the chain 102 being adjustably secured in an appropriate slot or other retaining means carried by a lug 104 near the left end of a horizontal guide rail 105 conventionally provided on the rear of the tractor 28. Thus, when the tractor 28 turns to the right and swings the left end of the rail 105 and its lug 104 to the left with respect to the pivotal mounting 29 of the tongue 27, the chain 102 is correspondingly pulled forward thereby pulling forward the left end of the forward disc frame 10 so that the parts are moved from the position of Fig. 1 to the position of Fig. 4, thereby placing the parts in better relationship for the right hand turn. Placing of the rearward disc frame 12 in such position is effected through the medium of a draft action produced by the connecting and positioning bar 16 which acts to swing the frame 12 about the rearward pivotal mount 15 on the lifting beam 14.

Operation

As will be apparent from the foregoing description, when the parts are in the operative position as illustrated in Figs. 1 and 2, actuation of the pump handle 54 by the driver of the tractor 28, as through the medium of a cable extending forward to the tractor as indicated in Fig. 2, operates the hydraulic elevator 24 (Fig. 5) so that the piston rod 49 and piston 50 are elevated with respect to the hydraulic cylinder 48, thereby elevating the lifting beam 14 and raising with it the balanced forward and rearward disc frames 10 and 12. This result is accomplished by reason of the fact that the arms 45 which carry the hydraulic cylinder 48 at their forward ends serve as lever means working through the transverse body portion of the forward axle 20, so that the ground wheels 18 and 19 tend to be depressed with respect to the carriage 22. As a consequence, the carriage 22, including its transverse yoke 40, and the lifting beam 14 are elevated. By reason of the adjustable connecting link 82 on the upstanding arms 80 and 81, Fig. 5, the axle 21 and the ground wheel 19 are caused to operate in unison with the axle 20 and the ground wheel 18. As previously stated, adjustment of the effective length of the link 82 through the medium of the threaded sleeve 85 provides for travel of the left ground wheel 19, for example, at a lower level in a furrow than the level of the ground wheel 18 on soil filling a furrow, whereby to maintain the disc frames and their discs substantially horizontal when in discing position. When the frames 10 and 12 are raised from the discing position, and it is desired to transport the vehicle on a roadway, the threaded sleeve 85 may be adjusted to vary the effective length of the linkage 82 and level the wheels 18 and 19 with respect to the frames.

For the purpose of transport, the lifting beam 14 and the discs frames 10 and 12 having been elevated by operation of the hydraulic elevator 24, as above described, a rearward thrust applied to the pull link 25, as by backing the tractor 28, forces rearward the left end of the rearward disc frame 12, and a corresponding forward movement of the left end of the forward disc frame 10 is imparted by thrust applied through the right end of the rearward disc frame 12 and the connecting bar 16 to the left end of the forward disc frame 10, so that the parts assume the position of Fig. 4. By then dropping a stop pin 100a into a forward hole 101 in the forward end of the pull link 25 as seen in Fig. 4, pull imparted to the forward end of the link 25 when the tractor moves forward is transmitted to the mentioned stop pin 100a and through it to the adjacent loop 92 and the left end of the forward rail 30 of the forward disc frame 10, the parts thereby maintaining the relationship shown in Fig. 4 upon forward travel.

When it is desired to return the parts from the transport position of Fig. 4 to the operative discing position of Figs. 1 and 2, the stop pin 100a is withdrawn and the valve handle 55 is pulled forward by the operator of the tractor to actuate the bleeder valve 65 and allow the lifting beam 14, the disc frames 10 and 12 and their discs 11 and 13 to descend into the operative position, as seen in Fig. 2. As previously indicated, the amount of penetration of the discs may be limited by the adjustable device shown in Fig. 6, the threaded sleeve 75 being adjusted on the screw 74 to space the upper end of the sleeve 75 from the stop arm 70 in accordance with the desired amount of earth penetration by the discs. The stop pin 100 of Fig. 1 is then placed as desired in one of the holes 101 in the pull link 25. Upon forward movement of the tractor 28, draft upon the draw bar 26 tends to swing the right end of the forward disc frame 10 forward to the position of Fig. 1 by draft action imparted through the clevis 96, and draft upon the pull link 25 by way of the clevis 95 causes the left end of the rearward disc frame 12 to be moved forward until the stop pin 100 strikes the rearward edge of the guide loop 92 on the front rail of the forward disc frame 10, at which time the stop pin 100 also preferably comes into engagement with the rearward edge of such front rail 30. Under these conditions, the connecting and positioning bar 16 functions to limit and control the relative movements of the disc frames 10 and 12 and thereby establish the desired positions of the parts somewhat as illustrated in Fig. 1. When the end of an excursion across a field has been reached, a left turn may be easily made with the parts remaining in the position of Fig. 1. When a right turn is commenced, the swinging of the lug 104 (Fig. 3) on the guiderail 105 places a draft upon the chain 102 which pulls the forward disc frame 10 up to the position of Figs. 3 and 4 and shifts the discs 11 and 13 correspondingly, thereby facilitating the turn. Also, a right turn may be made easily by first actuating the pump lever 54 to elevate the lifting beam 14 and the disc frames and their discs, whereupon the right turn is made with the load being carried by the ground wheels 18 and 19.

It is intended to cover all variations of the generic invention herein disclosed which fall within the scope of the claims.

I claim as my invention:

1. A wheeled disc harrow structure comprising: a forward disc frame; a rearward disc frame; a pair of ground wheels respectively disposed at the sides of said structure near the ends of said frames; axle means for said wheels; a carriage supported by said axle means; an overlying spacing and lifting median beam having its ends attached respectively to middle portions of said frames to lift the latter and having its middle portion supported and carried upon said carriage, said overlying median beam constituting the sole connection between said disc frames and said carriage; lever means connected with said axle means and directly underlying said beam; and elevator means disposed between and connected with said lever means and said beam for raising and lowering said beam and frames with respect to said wheels.

2. In combination in a wheeled disc harrow structure: a forward disc-carrying frame; a rearward disc-carrying frame; a pair of ground wheels; a pair of axles having longitudinally extending arms upon which said wheels are respectively journaled and having body portions extending transversely of said structure in approximate parallelism with each other; a carriage supported upon said axles and positioned transversely of said structure a longitudinally extending beam structure fixed on the middle of said carriage and having its ends pivotally attached to central portions of said frames respectively to provide for variable angular divergence of said frames; and elevator means connected between one of said axles and said beam structure for raising and lowering said beam structure and frames with respect to said wheels.

3. A combination as in claim 2 wherein said wheels, axles and elevator means are disposed between said frames and said carriage is attached to said frames only through said beam structure and its pivotal attachments.

4. A combination as in claim 2 wherein the body portion of each axle is provided with a member adjustable with respect to the member on the other body portion to vary the relative angularity of said longitudinally extending arms and the relative height of said wheels with respect to said frames, adjusting means being carried by and connecting said members.

5. A combination as in claim 2 including stop means for adjustably limiting the lowering of said beam structure.

6. A combination as in claim 2 wherein one of said axles includes lever means directly underlying said beam structure, and said elevator means is disposed in an upstanding position between an end portion of said lever means and an overlying portion of said pivoted beam structure.

7. A wheeled disc harrow structure comprising: a forward disc frame; a rearward disc frame; a pair of ground wheels respectively disposed at the sides of said structure near the ends of said frames; crank axle means upon which said wheels are mounted; a carriage disposed transversely of said structure and supported by said axle means, said carriage comprising a rigid, transversely extending yoke; an overlying spacing and lifting beam having its ends pivotally attached respectively to middle portions of said frames to lift the latter, said frames being connected with said carriage solely through said pivotal connections with said beam, and the middle portion of said yoke being attached to an intermediate portion of said beam; lever means connected with said axle means and underlying said beam; and elevator means disposed between and connected with said lever means and said beam for raising and lowering said beam and frames with respect to said wheels.

8. A structure as in claim 7 wherein said frames are approximately balanced laterally with respect to their respective points of attachment to the ends of said beam.

9. A structure as in claim 8 wherein said elevator means comprises a vertically disposed hydraulic jack having its opposite ends respectively connected to an outer portion of said lever means and to an immediately overlying portion of said lifting beam, at least one end of said jack being connected by a relatively pivotal connection.

10. A wheeled disc harrow structure comprising: a forward disc frame; a rearward disc frame; a pair of ground wheels respectively disposed at the sides of said structure near the ends of said frames; axle means for said wheels; a carriage supported by said axle means; an overlying spacing and lifting median beam having its ends attached respectively to middle portions of said frames to lift the latter and having its middle portion supported and carried upon said carriage; lever means connected with said axle means and directly underlying said beam; and elevator means disposed between and connected with said lever means and said beam for raising and lowering said beam and frames with respect to said wheels, said elevator means comprising a vertically disposed hydraulic jack having its opposite ends repectively connected to an outer portion of said lever means and to an immediately overlying portion of said median beam, at least one end of said jack being connected by a relatively pivotal connection.

OTTO W. DOMRIES.

REFERENCES CITED

The following references are of record in the file of this patent:

UNITED STATES PATENTS

| Number | Name | Date |
| --- | --- | --- |
| 1,830,422 | Brice | Nov. 3, 1931 |
| 2,126,446 | Bordersen | Aug. 9, 1938 |
| 2,143,192 | Goble | Jan. 10, 1939 |
| 2,356,876 | Newkirk | Aug. 29, 1944 |
| 2,402,884 | Gier | June 25, 1946 |
| 2,469,622 | Acton | May 10, 1949 |